Dec. 24, 1940.   C. I. BAKER ET AL   2,225,853
METHOD OF AND APPARATUS FOR MAKING GRIDS
Filed Dec. 13, 1938   3 Sheets-Sheet 1

INVENTORS: C.I.BAKER
V.D.BARKER
C.W.MAURER

BY

E.R. Nowlan

ATTORNEY

Dec. 24, 1940.  C. I. BAKER ET AL  2,225,853
METHOD OF AND APPARATUS FOR MAKING GRIDS
Filed Dec. 13, 1938  3 Sheets-Sheet 3

INVENTORS: C. I. BAKER
V. D. BARKER
C. W. MAURER
BY
E.R. Nowlan
ATTORNEY

Patented Dec. 24, 1940

2,225,853

UNITED STATES PATENT OFFICE 2,225,853

METHOD OF AND APPARATUS FOR MAKING GRIDS

Carl I. Baker, Pearl River, N. Y., Virgil D. Barker, Westfield, N. J., and Carl W. Maurer, Freeport, N. Y., assignors to Western Electric Company, Incorporated, New York, N. Y., a corporation of New York Application December 13, 1938, Serial No. 245,418

17 Claims. (Cl. 29—33)

This invention relates to a method of and apparatus for making grids, and more particularly to a method of and apparatus for making vacuum tube grids.

Grids for vacuum tubes have been formed by welding the grid wires to their supports. In thus welding the wires much care must be taken to form a satisfactory connection and avoid burning of the wires. Even then it is difficult to form a grid having uniformity of contour. Grids for vacuum tubes have also been formed by winding a grid wire about spaced notched bars, the latter being swaged to grip the convolutions of the wires. In forming grids in this manner difficulty has been found in forming small grids.

Objects of the invention are to provide a simple and efficient method of and apparatus for making grids without employing welding as a securing means between the grid wires and their supports.

With these and other objects in view, the invention comprises an apparatus by the aid of which a method may be practised by advancing round parallel bars, forming notches therein, placing lateral grid wires in the notches, swaging the bars to lock the wires in place, pressing the bars flat, severing portions of the flat bars and forming the severed portions into circular heads.

Other objects and advantages will be apparent from the following detailed description taken in conjunction with the accompanying drawings, wherein Fig. 1 is a side elevational view partially in section of the apparatus by the aid of which a method may be practised;

Figure 1:
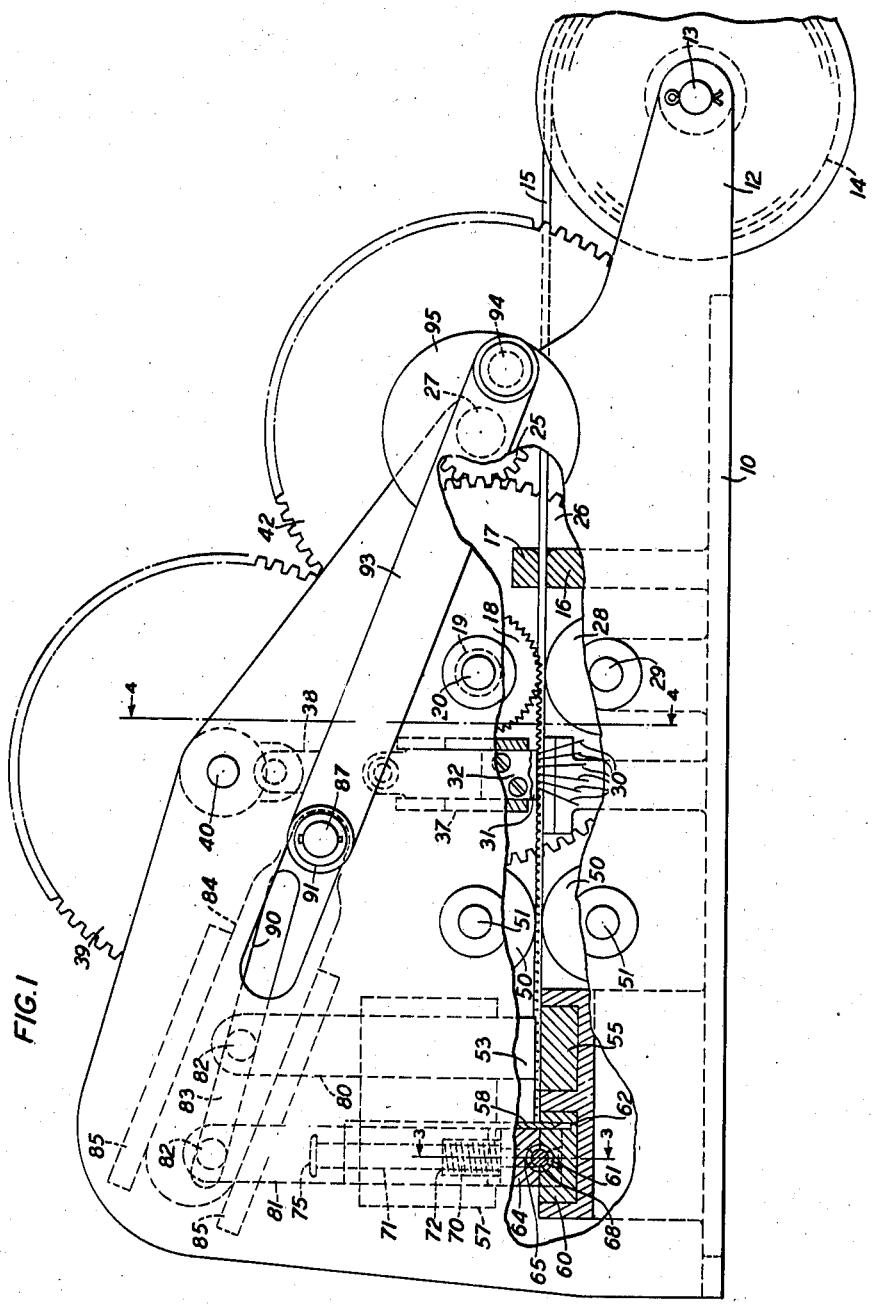
Figure 2:
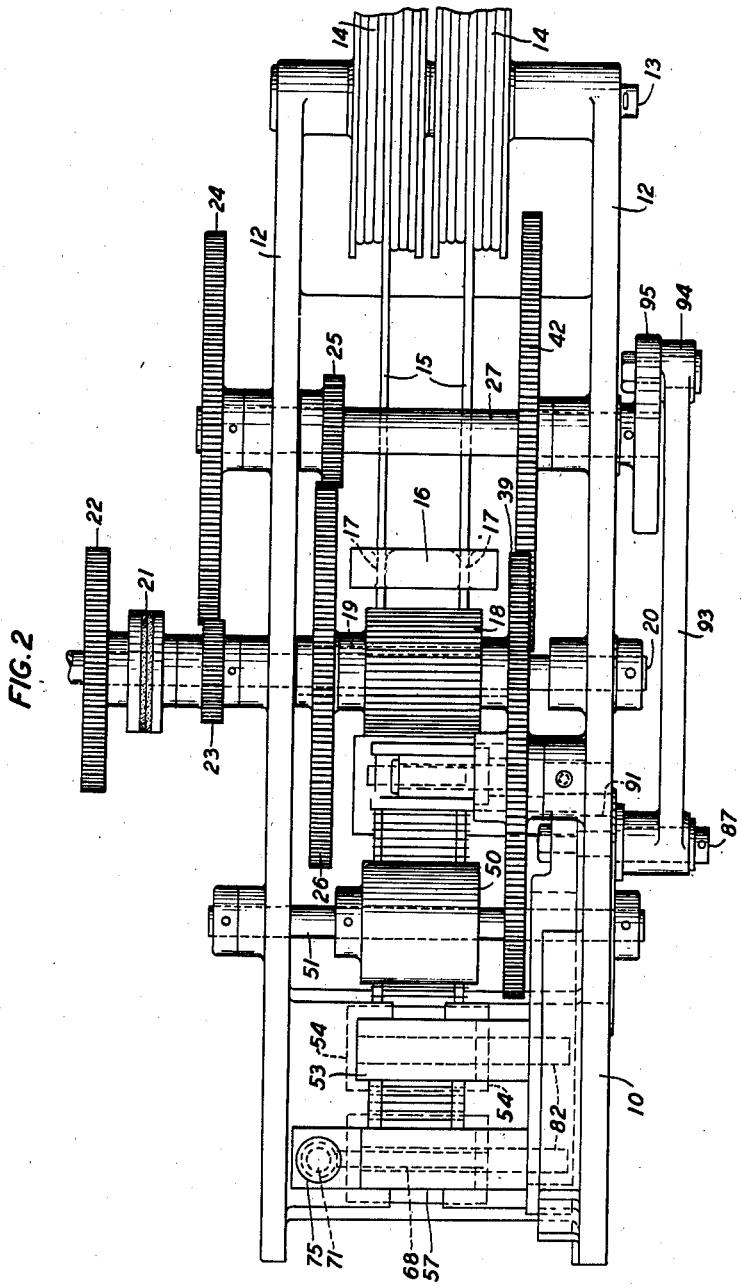
Fig. 2 is a top plan view of the apparatus.

Referring now to the drawings, particularly Figs. 1 and 2, a frame 10 of a suitable contour, as illustrated in these figures, is mounted upon a suitable support (not shown) and has spaced projections 12 to removably receive and support a shaft 13 for a pair of supply reels 14. The supply reels 14 are relatively narrow in width, so as to supply round bars 15 to the apparatus in substantially equally spaced parallel relation. Suitable means, such as a guide 16, having spaced apertures 17 therein, is mounted upon the frame 10 to guide the bars 15 in their predetermined spaced relationship during advancement.

Means for advancing the bars consists of a serrated roller 18 fixedly mounted upon a hollow shaft 19 and driven at a predetermined speed in a clockwise direction. A shaft 20 extending through bearings in the vertical walls of the frame 10 and through the hollow shaft 19 is operatively connected to a power means (not shown) through a friction clutch 21, or other suitable means, and a gear 22. A chain of gears 23, 24, 25 and 26 operatively connects the shaft 20 to the hollow shaft 19, the gears 24 and 25 being fixedly mounted upon a shaft 27 journalled in bearings in the frame while the gear 23 is fixed to the shaft 20 and the gear 26 is fixed to the hollow shaft 19. A second, yet still more important, function of the serrated roller 18 is to form equally spaced notches in the upper portions of the bars, the notches in one bar being in alignment with the notches of the other. To assist the serrated roller in forming the notches in the bars and limiting the depth of these notches, an idler roller 28 is mounted upon a shaft 29 and rotatably journalled in the frame 10. There are intervals during the operation of the apparatus when there should be a pause in the advancement of the bars. This may be taken care of through the friction clutch 21.

Figure 8:
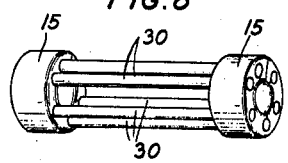
Fig. 8 is a perspective view of the completed article.

After the bars 15 have been notched, a predetermined number of grid wires 30 may be fed across the bars and laid in successive aligned notches therein. In the present embodiment of the invention the article to be formed, as illustrated in Fig. 8, has six grid wires therein and these wires, supplied from six different supply reels (not shown), may be fed as a group manually, or if desired a suitable mechanically actuated arm may be employed to automatically feed the wires into the notches of the bars.

Figure 4:
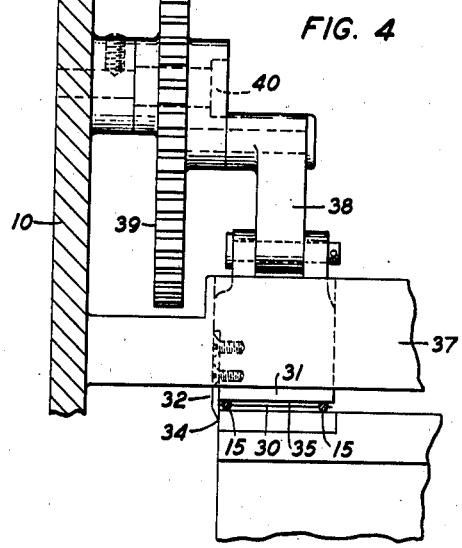
Fig. 4 is a fragmentary detailed view taken substantially along the line 4—4 of Fig. 1.
Figure 5:
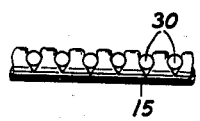
Figs. 5, 6 and 7 are enlarged end views of the article at the completion of different steps of the method.
Figure 6:
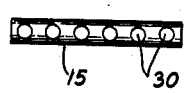

After the wires have been fed into their respective notches a reciprocable element 31 (Figs. 1, 2 and 4), having a knife 32 mounted thereupon and positioned to be moved into engagement with a cooperating cutting member 34 fixed to the frame 10, is conditioned to be moved downwardly to sever the wires. The element 31 also has a flat under surface 35 positioned to strike the upper surfaces of the bars over the wires disposed therein to partially swage the bars, as illustrated in Fig. 5, to secure the wires against displacement. The element 31 is slidably disposed in a guideway 37 fixed to the frame 10 and spaced from the bars a sufficient distance to allow feeding of the wires therebeneath. Reciprocatory movement is imparted to the element 31 by mechanism operatively connecting it to the shaft 20. This mechanism consists of a link 38 pivotally connected at one end to the element 31 and at the other end to a gear 39. The connection of the link 38 with the gear 39 is eccentric with respect to the axis of rotation of the gear so as to cause a complete cycle of reciprocatory movement of the element 31 during each rotary cycle of the gear. The gear 39 is mounted rotatably upon a stub shaft 40 carried by the frame 10 and interengages a gear 42 fixedly mounted upon the shaft 27. Therefore, during rotation of the shaft 20 power is transmitted through gears 23 and 24 through shaft 28, gears 42 and 39, and link 38 to the element 31.

After the grid wires 30 have been fed to the notches in the bars and have been severed by the knife 32 and held against displacement by the partial swaging of the bars caused by the element 31, the bars 15 with the lateral grid wires are advanced between pre-pressing rollers 50, which are mounted upon shafts 51 journalled in bearings of the frame 10. In passing between the rollers 50 the bars 15 are further pressed, yet the bars receive their final pressing and forming at the next position, namely a position beneath a reciprocable forming element 53.

The forming element 53 is slidable vertically in guideways 54 carried by the frame 10 and has a flat under surface of sufficient width to extend across both bars 15 and of sufficient thickness to form portions of the bars of equal or greater lengths than required for each article. An abutting block 55 mounted in a recessed portion of the frame 10 is positioned to support the bars while they are being formed. The operation of the forming element 53 will hereinafter be described.

The bars 15 are advanced from the forming position beneath the element 53 to a position where predetermined lengths thereof are positioned between a cutting and forming unit 57. In the present embodiment of the invention the article being formed is shown with six lateral or grid wires therein. Therefore, the bars 15 are advanced to position lengths thereof having six lateral wires therein beyond the edge of a cutting knife 58 prior to actuation of the unit 57 upon which the knife is mounted. The unit 57 is composed of three parts in addition to the cutting knife 58, these parts consisting of a stationary forming and shearing die 60, a movable forming die 64, and a core 68. The stationary forming die has a semi-circular concave groove 61 in the upper surface thereof and a slot 62 positioned to receive the knife 58 and to provide a shearing surface cooperating with the knife in severing portions from the bars. The stationary die 60 is mounted in a suitable recess of the frame 10. The movable forming die 64 has a semi-circular concave recess 65 in the lower surface thereof positioned to cooperate with the recess 61 in the stationary forming die 60 to form the portions of the bars 15 in circular formation. The third portion of the unit 57, namely, the core 68, is rigidly carried by a block 69 and positioned to extend between the grooves 61 and 65 of the dies 60 and 64. The block 69 is slidably disposed in a suitable guideway and is normally urged downwardly by a helical spring 70 disposed concentric with a rod 71 and partially embedded in a recess 72 in an offset portion of the die portion 64. The rod 71 has its lower end extending through and fixed to the block 69 and extends vertically through an aperture 74 to a position above the die member 64, where it is provided with a head portion 75, the purpose of the head portion being to limit the downward movement of the core 68 by the spring 70.

The forming element 53 and the unit 57 have vertically extending projections 80 and 81, respectively, with pins 82 in their upper ends extending laterally therefrom and positioned in a transversely extending cam slot 83 of an actuating cam 84. The actuating cam 84 is slidable in guideways 85 of the frame 10 and has its inner end supporting a connecting rod 87 (Figs. 1 and 2). The connecting rod 87 extends through an elongate aperture 90 in the adjacent wall of the frame 10 and has disposed thereon a roller 91 positioned to ride between and upon the parallel walls of the aperture 90 during reciprocatory movement of the cam 84. Reciprocatory movement is imparted to the cam through a link 93, having one end mounted upon the connecting rod 87 and the other end connected eccentrically at 94 to a wheel 95, the latter being fixed to the shaft 27.

During operation of the apparatus in carrying out the various steps of the method to produce the article the apparatus is set in motion, causing rotation of the serrated roller 19 to advance the bars from their supply reels 14 to the aperture 17 in the guide 16.

Figure 3:
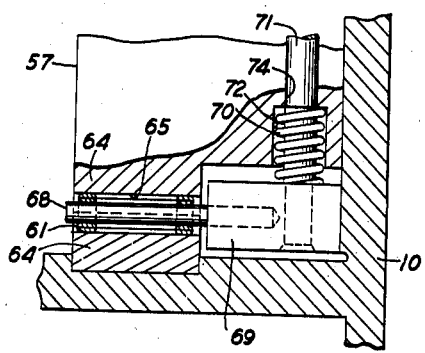
Fig. 3 is an enlarged fragmentary sectional view taken along the line 3—3 of Fig. 1.
Figure 7:
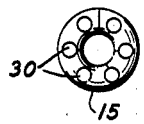

As the bars 15 pass between the serrated roller 18 and the idler roller 28 aligned grooves or notches are formed in the upper portions thereof. In forming the notches in the bars the excess material, disturbed by the projections of the serrated roller, moves upwardly to allow notches for receiving the lateral grid wires 30, which material will be partially pressed around the wires during the actuation of the element 31. At this, the second position, beneath element 31, the grid wires are severed by the actuation of the knife 32 and each wire is clamped in place by the partial swaging of the disturbed material of the bars therearound, as illustrated in Fig. 5. The bars and the lateral grid wires are advanced between the rollers 50, where the disturbed material of the bars is further pressed about the grid wires. The bars are finally flattened when they are positioned beneath the forming element 53 and when they are advanced a sufficient distance relative to the forming unit 57, portions of predetermined lengths are severed from the bars by the knife 58, which portions contain a desired number of lateral grid wires to be included in the completed article. The article is completed in the forming unit which, during the downward movement thereof, first severs the portions of predetermined length from the bars. During further downward movement of the unit these severed portions are engaged by the core 68 which, by the force of the downward movement of the unit, will cause the bar portions to be pressed into the concave recess 61 of the stationary die 60, forming the portions into substantially U-shape, with the ends thereof extending vertically upon each side of the core. Further downward movement of the unit 57 will cause compression of the spring 70, which has been of sufficient force to cause the core 68 to partially form the bar portions. This further downward movement of the unit 57 will bring the movable die portion 64 downwardly until it engages the upper surface of the stationary die, causing the ends of the bar portions to be brought together to complete the circular formation of the bar portions about the core, as illustrated in Figs. 2, 3 and 7. Upward movement of the unit 57 will free the movable die 64 from the stationary die 60 and the force of the spring 70 limited by the head 75 will move the rod 71 to position the core 68 holding the finished grid or article between the dies 60 and 64 in their open position so that the article may be readily removed from the core manually or by any suitable mechanical means.

The results of the various elements on the bars during the processing thereof through the apparatus have been described, and now attention is directed to the operating mechanism for controlling these elements. The serrated roller is driven from a power means (not shown) through the gear 22 and the friction clutch 21 or other suitable connecting means. To drive the serrated roller at a desired speed determined by the number of lateral grid wires desired for each article, the speed of rotation of the serrated roller is reduced by connecting the roller to the hollow shaft 19 and through this shaft to the driven shaft 20 by means of the gears 23, 24, 25 and 26.

The element 31 is connected to the power means through gears 39, 42, shaft 27, and gears 24 and 23. Thus rotation of the gear 39, as illustrated in Figs. 1 and 4, will cause reciprocatory movement to be imparted to the element through the link 38.

The rollers 50 are not driven by the power means but are rotated by the passage of the bars therebetween.

The forming element 53 and the unit 57 are actuated by the same operating means, namely the movement of the cam 84, which is brought about by rotation of the wheel 95, the power of which is traced to the shaft 20 through the shaft 27, gear 24, and gear 23, causing reciprocation of the cam through the link 93 to move the cam slot 83 relative to the pins 82. The cam 84 is shown in Fig. 4 in the lower position, in which position the element 53 and the unit 57 have completed their work. Movement of the cam 84 upwardly causes the cam slot or aperture 83 to move the forming element and unit upwardly.

The article formed by the apparatus and by following the steps of the method is composed of cylindrical collars, fabricated from round bars and pressed into flat or substantially rectangular cross-sectional formation, with the grid wires firmly embedded therein, eliminating the necessity of welding the wires to the collars and the damage which might occur to the collars and wires as a result of welding.

The embodiments of the invention herein disclosed are illustrative only and may be widely modified and departed from in many ways without departing from the spirit and scope of the invention as pointed out in and limited only by the appended claims.

What is claimed is:

1. A method of making grids comprising forming grooves in bars, feeding grid wires to the grooves, and swaging the bars to secure the wires therein.

2. A method of making grids comprising forming grooves in bars, feeding grid wires to the grooves, swaging the bars to secure the wires therein, and forming the bars circularly.

3. A method of making grids comprising forming grooves in bars, feeding grid wires to the grooves, and flattening the bars to embed the wires therein.

4. A method of making grids comprising forming grooves in bars, feeding grid wires to the grooves from supplies, severing predetermined lengths of wires from the supplies, and swaging the bars to secure the wires therein.

5. A method of making grids comprising forming grooves in bars, feeding grid wires to the grooves from supplies, and simultaneously severing predetermined lengths of wires from the supplies and swaging the bars to secure the wires therein.

6. A method of making grids comprising forming grooves in round rods, feeding grid wires to the grooves, and flattening the rods to embed the wires therein.

7. A method of making grids comprising forming grooves in bars, limiting the depth of the grooves during forming thereof, feeding grid wires to the grooves, and swaging the bars to secure the wires therein.

8. A method of making grids comprising forming grooves in bars, feeding grid wires to the grooves from supplies, severing predetermined lengths of wires from the supplies, severing portions from the bars, and forming the portions.

9. In an apparatus for making grids, means for advancing spaced bars, means to form grooves in the bars to receive grid wires, and means to swage the bars to secure the wires to the bars.

10. In an apparatus for making grids, means for advancing spaced bars, means to form grooves in the bars to receive grid wires, means to swage the bars to secure the wires to the bars, and means to sever portions of predetermined length from the bars.

11. In an apparatus for making grids, means for advancing spaced bars, means to form grooves in the bars to receive grid wires, means to swage the bars to secure the wires to the bars, means to sever portions of predetermined length from the bars, and means to cause circular forming of the bars.

12. In an apparatus for making grids, means for advancing spaced bars in parallel relation, means to form grooves in the bars to receive grid wires, and means to swage the bars to secure the wires to the bars.

13. In an apparatus for making grids, means for advancing spaced round bars, means to form grooves in the bars to receive grid wires, and means to flatten the bars to embed the ends of the wires therein.

14. In an apparatus for making grids, means for advancing spaced round bars, means to form grooves in the bars to receive grid wires, means to flatten the bars to embed the ends of the wires therein, and means to cause circular forming of the bars.

15. In an apparatus for making grids, means for advancing spaced round bars, means to form grooves in the bars to receive grid wires, means to flatten the bars to embed the ends of the wires therein, means to cause circular forming of the bars, and means to sever portions of predetermined length from the bars.

16. In an apparatus for making grids, means for advancing spaced round bars, means to form grooves in the bars to receive grid wires, means to flatten the bars to embed the ends of the wires therein, means to cause circular forming of the bars, and means to sever portions of predetermined length from the bars and complete the forming of the portions.

17. In an apparatus for making grids, means for advancing bars, means to form grooves in the bars to receive grid wires, means to sever the grid wires into predetermined lengths, and means to swage the bars to secure the wires to the bars.

CARL I. BAKER.
VIRGIL D. BARKER.
CARL W. MAURER.